US008231467B2

(12) United States Patent
Radek

(10) Patent No.: US 8,231,467 B2
(45) Date of Patent: Jul. 31, 2012

(54) WAGERING GAME MACHINE WITH SCALABLE FIDELITY AUDIO

(75) Inventor: Paul Radek, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 337 days.

(21) Appl. No.: 12/599,247

(22) PCT Filed: May 5, 2008

(86) PCT No.: PCT/US2008/005764

§ 371 (c)(1),
(2), (4) Date: Nov. 6, 2009

(87) PCT Pub. No.: WO2008/137130

PCT Pub. Date: Nov. 13, 2008

(65) Prior Publication Data

US 2010/0248815 A1 Sep. 30, 2010

Related U.S. Application Data

(60) Provisional application No. 60/916,454, filed on May 7, 2007.

(51) Int. Cl.
*A63F 13/00* (2006.01)

(52) U.S. Cl. .......................................... 463/35

(58) Field of Classification Search .................. 463/35
See application file for complete search history.

(56) References Cited

U.S. PATENT DOCUMENTS

| | | | | |
|---|---|---|---|---|
| 5,809,472 | A * | 9/1998 | Morrison | 704/500 |
| 5,909,496 | A | 6/1999 | Kishigami et al. | |
| 6,507,799 | B2 | 1/2003 | Steffen | |
| 6,748,206 | B1 * | 6/2004 | Matsumoto | 455/334 |
| 2007/0015570 | A1 * | 1/2007 | Pryzby | 463/25 |

OTHER PUBLICATIONS

"International Application Serial No. PCT/US2008/005764, International Search Report and Written Opinion mailed Aug. 22, 2008", 10 pgs.

* cited by examiner

*Primary Examiner* — Peter DungBa Vo
*Assistant Examiner* — Jeffrey Wong
(74) *Attorney, Agent, or Firm* — Schwegman, Lundberg & Woessner, P.A.

(57) ABSTRACT

A computerized wagering game system includes a gaming module comprising gaming code which is operable to present a wagering game on which monetary value can be wagered, and an audio module. The audio module is operable selectively reduce the information content of a digital audio signal based on available audio resources.

20 Claims, 4 Drawing Sheets

WAGERING GAME MACHINE WITH SCALABLE FIDELITY AUDIO

RELATED APPLICATIONS

This patent application is a U.S. National Stage Filing under 35 U.S.C. 371 from International Patent Application Serial No. PCT/US2008/005764, filed May 5, 2008, and published on Nov. 13 2008, as WO 2008/137130 A1, which claims the priority benefit of U.S. Provisional Patent Application Ser. No. 60/916,454 filed May 7, 2007 and entitled "SCALABLE FIDELITY AUDIO ENGINE IN A WAGERING GAME MACHINE", the contents of which are incorporated herein by reference in their entirety.

FIELD OF THE INVENTION

The invention relates generally to audio in a wagering game machine environment, and more specifically to a scalable fidelity audio engine in a wagering game machine.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio, video, and mechanical features into wagering game systems enhance the environment presented are therefore important elements in the attractiveness and commercial success of a computerized wagering game system. A variety of complex graphics and video capabilities are also often provided via one or more specialized graphics processors, including the ability to decode and render full motion video, and to render complex three-dimensional graphics. Complex sound, such as multi-channel audio and a variety of sound effects and recorded audio are also used to enhance the game experience.

But, with the advent of portable wagering game machines, the multimedia resources available within a wagering game system can be significantly limited relative to a full-sized casino wagering game system. Video capability is limited by a reduced screen size and resolution, and audio capabilities are limited by the reduced size and capabilities of portable wagering game system speakers.

SUMMARY

One example embodiment of the invention comprises a computerized wagering game system including a gaming module comprising gaming code which is operable when executed on to conduct a wagering game on which monetary value can be wagered, and a virtual input device. The virtual input device is operable to receive input from a user by detecting a position of a user input object such as a finger.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising gaming code which is operable when executed on to conduct a wagering game on which monetary value can be wagered, and an audio module. The audio module is operable selectively reduce the information content of a digital audio signal based on available audio resources.

Because audio capabilities in a portable wagering game machine are typically limited such as by the reduced size and power capabilities of the speakers, it is desirable in some embodiments to manage the audio fidelity of the audio signals being used in the wagering game system consistent with the perceivable audio fidelity of the sound system hardware to reduce the processing requirements, reduce memory use, and improve the battery life of the portable wagering game system. Further, a portable wagering game machine having relatively low quality speakers will not benefit from very high resolution audio, so the fidelity of some audio signals can be reduced without audible reduction in sound quality.

Figure 1:
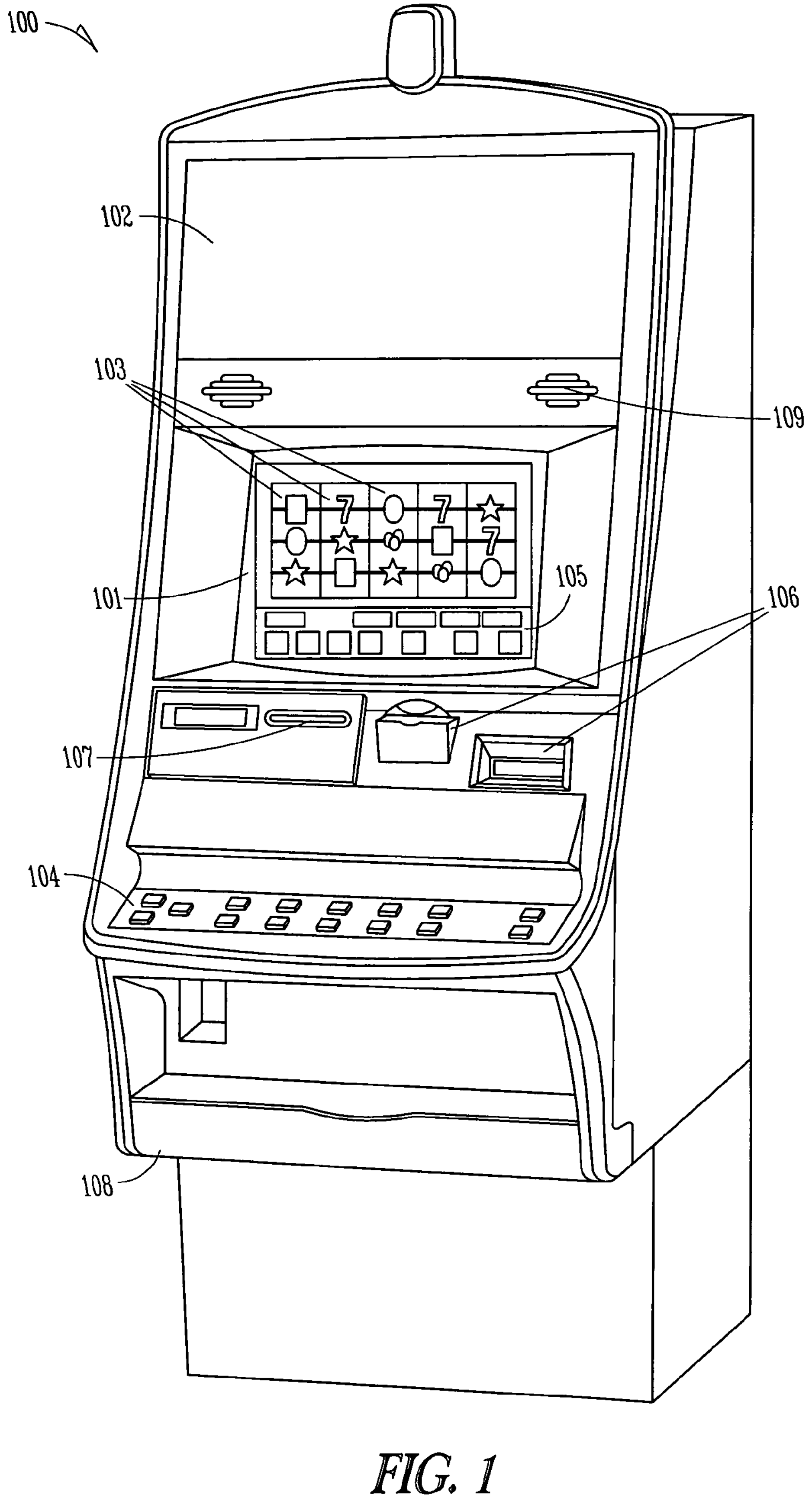
FIG. 1 shows a computerized wagering game machine, as may be used to practice some example embodiments of the invention.

FIG. 1 illustrates a typical computerized wagering game machine, as may be used to practice some embodiments of the present invention. The computerized gaming system shown generally at 100 is a video wagering game system, which displays information for at least one wagering game upon which monetary value can be wagered on video display 101. In a further example, a second video display 102 is provided as a part of a top-box assembly, such as to display a bonus game or other information. Video displays 101 and 102 are in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 103 that comprise a part of a video slot machine wagering game.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold 'em games. The wagering game is played and controlled with inputs such as various buttons 104 or via touchscreen overlay buttons 105 on video screen 101. In some alternate examples, other devices such as pull arm are used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 106 or a secure user identification module interface 107, and winnings are returned via the returned value card or through the coin tray 108. Sound is also provided through speakers 109, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions. In other embodiments, the wagering game system is a portable wagering game system, or has another format different from that illustrated in FIG. 1.

Figure 2:
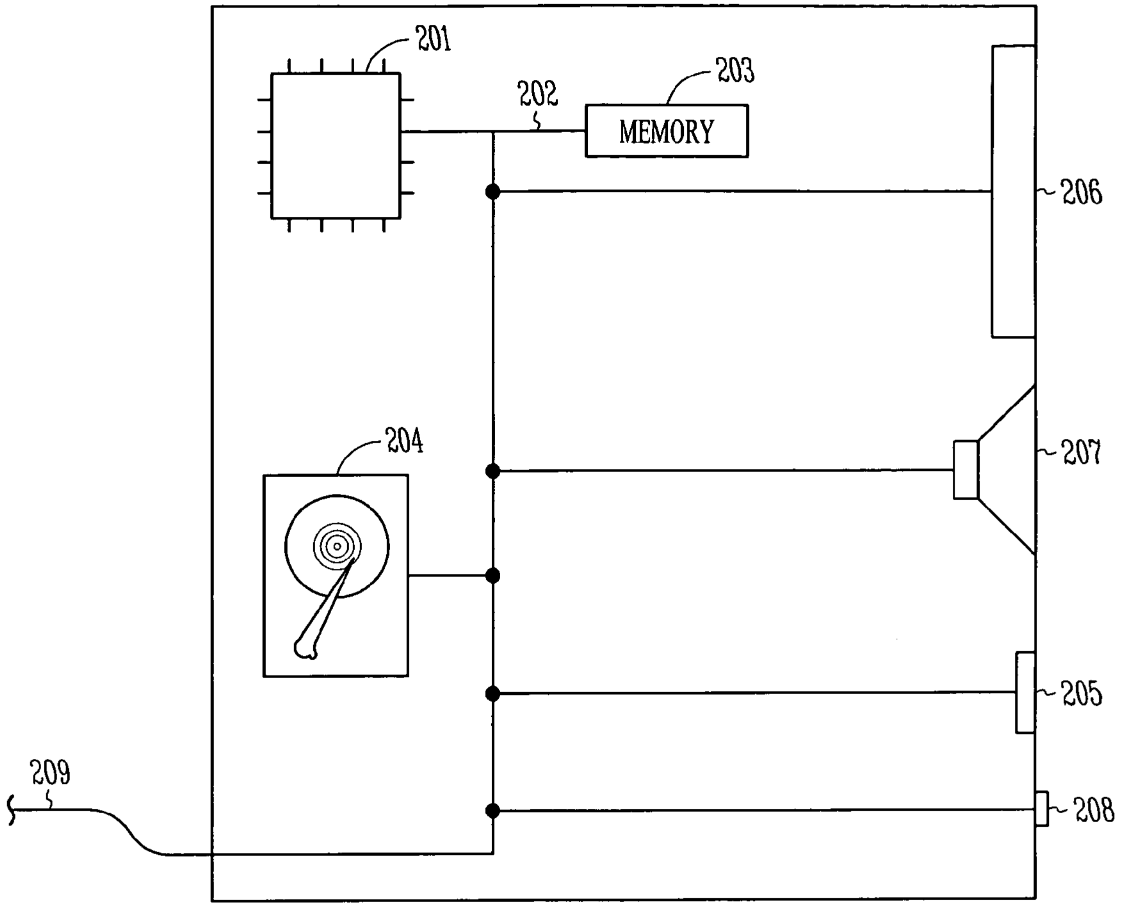
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game machine is coupled to other wagering game machines, and to various other elements such as game servers, accounting servers, or community or progressive game servers via the network connection 209, and exchanges data with these machines via the network connection.

Figure 3:
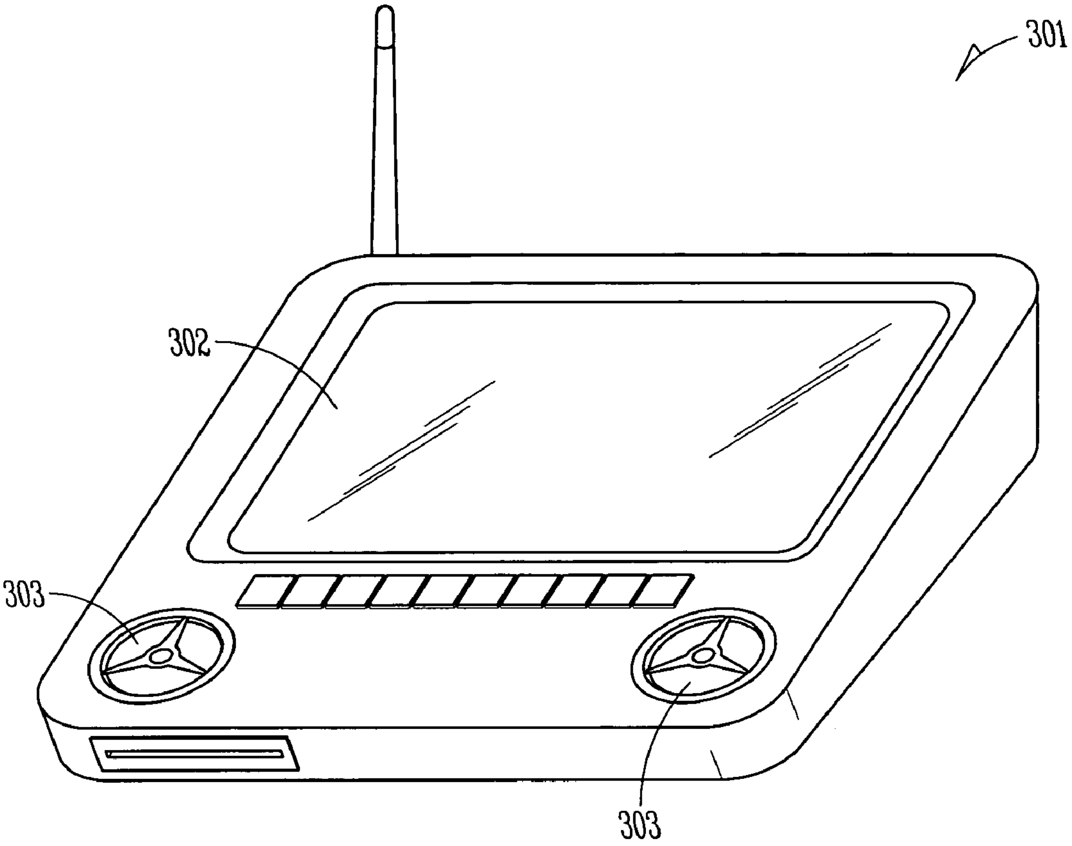
FIG. 3 shows a portable wagering game system having an audio module comprising limited fidelity speakers, consistent with an example embodiment of the invention.

FIG. 3 illustrates an alternate format for a wagering game machine, consistent with an example embodiment of the invention. A portable wagering game machine 301 includes a touchscreen display 302, and speakers 303, used to present a wagering game to a game player. The portable wagering game machine in some embodiments is operable to download or play the same wagering games available in full-size casino game machines such as that of FIG. 1, and in other embodiments uses games developed especially for the portable wagering game system. The speakers 303 are in this example smaller, lower fidelity speakers than are incorporated into full-size wagering game machines such as that of FIG. 1, and are not capable of producing the full audio range of frequencies or reproducing sound with the same fidelity as the audio system on the full-sized wagering game machine.

Further, the portable wagering game machine 301 is battery powered, and in some embodiments has limited processing and other resources to conserve power. When a compact disc quality audio track comprising stereo digital audio signals comprising 44,100 kHz or samples per second with 16 bits of resolution per sample is processed, such as by mixing it with another audio signal, equalizing the audio signal, or synthesizing the audio signal from another format such as a MIDI track, the workload on the processor is significant. By reducing the sampling rate to 22.05 kHz and 8 bits of data per sample, the amount of audio information that needs to be processed is cut by 75%. This reduces the amount of processor time consumed by the audio module, freeing processor time for other things and reducing the power consumed in the processor.

Digital audio signals typically comprise a series of measurements or samples of the amplitude or volume of a sound signal, such that thousands of samples taken per second measure and record the changing level of the recorded sound. The number of samples taken per second, or the sample rate, determines the highest frequency that can be recorded using the sampling method. According to the Nyquist sampling theorem, sampled sound can contain information up to half the frequency of the sampling rate. As an example, CD audio sampled at 44.1 kHz can store audio information up to 22.05 kHz, which is slightly above the maximum audio frequency a healthy young adult can hear under ideal conditions.

Similarly, the number of bits used to store each audio sample determines the fidelity or resolution of the audio signal. Compact discs use 16 bits, and audio research has suggested that healthy, young adults can't hear a difference between audio sampled using 22 or more bits. Lower bit resolutions, such as 8-bit or 12-bit sampled audio are useful for applications where the full perceivable audio resolution is not needed, such as for voice communication or where speakers or other parts of the audio system limit the audio system's reproducible fidelity. Compressed digital audio signals often store audio information in other formats, such as by storing time-based frequency content rather than time-based amplitude samples, but such signals are typically converted to time-sampled digital audio signals before any processing or filtering is performed in playback.

The digital audio signal with reduced information in the example portable wagering game system 301 content does not significantly affect the perceived sound quality, as the reduced sampling rate reduces the highest reproducible frequency from approximately 22 kHz to 11 kHz, which approaches both the practical high frequency hearing limit for an older adult and approaches the high frequency reproduction limit of some typical small full-range speakers 104. Similarly, reducing the number of bits per digital audio sample from 16 to 8 bits results in audible degradation of sound in high fidelity audio systems, but is significantly less noticeable when using relatively low quality speakers such as are typically found in small electronic devices.

The speakers 303 are limited both in their ability to accurately produce low frequencies and high frequencies by their limited size and excursion, and by their application as full-range speakers. The ability of a speaker to produce low frequencies is limited by its diameter and excursion, as the volume of air that must be moved to reproduce low frequency sounds is much higher than for high frequencies. Speakers are similarly limited in their ability to produce a broad range of sounds, as speakers that are large enough to produce intermediate to low frequencies typically can't produce high frequencies without significant distortion, and cause beaming of the high frequencies such that reproduced high frequencies are more directionally dependent than lower frequencies.

For this reason, high fidelity audio systems often use multiple speaker drivers designed for different frequency ranges, or use special tricks such as ports and transmission lines to improve the fidelity of full range speakers. Small speakers such as those found in typical portable electronic devices are typically therefore limited in their fidelity, both in terms of distortion and frequency response.

Figure 4:
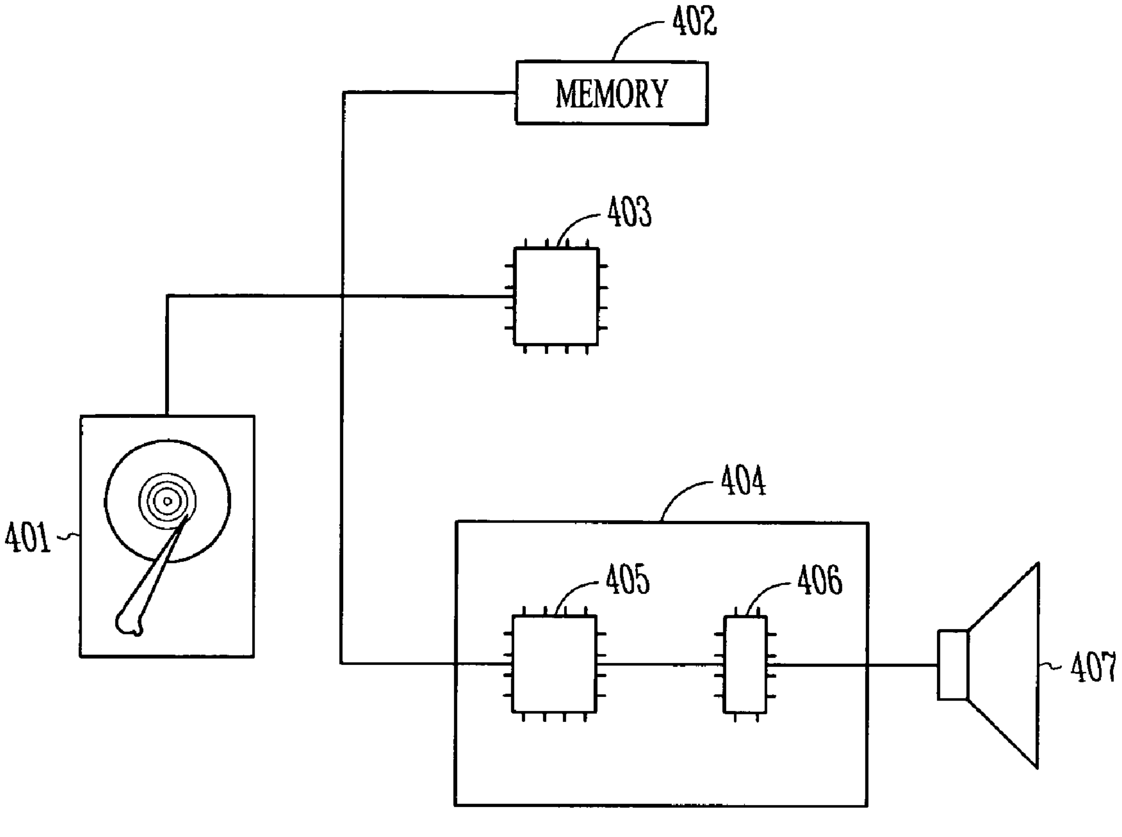
FIG. 4 is a block diagram of an audio module operable to selectively reduce the information content of a digital audio signal, consistent with an example embodiment of the invention.

FIG. 4 shows a block diagram of an audio module operable to selectively reduce the information content of a digital audio signal, consistent with an example embodiment of the invention. Audio information, such as prerecorded music and sound effects, MIDI or other encoded sound data, and other representations of sounds are stored on the hard disk drive or other nonvolatile storage 401. The sounds stored in the non-volatile storage medium are loaded into memory 402 at the instruction of a processor 403, which is executing wagering game program code that makes use of the sounds. In some examples, the some or all of the sounds loaded into memory are also reduced in information content such as by reducing their sampling rate or bit resolution by the processor before being stored in memory, reducing the amount of memory needed to store the sound and the bandwidth needed to use the sounds stored in memory.

When played, the audio information is transferred from memory to an audio module or system 404, which is operable to receive the digital audio data and convert it to audible sound. The audio module in this example comprises an audio processor or digital signal processor 405, which is operable to perform certain functions such as decoding sounds that have been encoded using certain coding techniques such as Dolby Digital or other surround sound, MP3 or other compressed sound, and other such coding or decoding functions. The digital signal processor 405 is also operable to mix or combine different sounds, to equalize or filter sounds, and to perform other operations on the digital audio. The resulting digital audio signal is provided as a time-sampled or pulse-code modulated digital audio signal to a digital-to-analog converter 406, which converts the digital output signal to analog for playback through speaker 407. In some alternate embodiments, the digital-to-analog converter is omitted, and a digital audio amplifier is used to provide a digital pulse amplitude or pulse width modulated signal to the speaker 407 for playback.

The digital audio signals are in various embodiments selectively converted to digital audio signals containing reduced information, such as a lower sample resolution or lower sampling rate, to reduce the amount of audio information that must be processed in producing audible sound. In one embodiment, the audio information is selectively reduced when the audio signal is transferred from nonvolatile storage to main memory 402, such as by dropping half or some other portion of the digital audio samples, or discarding some of the least significant bits of each sample. In another embodiment, the processor 403 performs a similar reduction in audio signal information content when transferring sound data from memory 402 or nonvolatile storage 401 to the audio module 404. In an alternate example, the audio module 404 receives a compressed or encoded sound, and decodes the sound via digital signal processor 405 before discarding audio information in the audio signal.

The digital signal processor is also able on some embodiments to reduce the information content of an audio signal and operate more efficiently by changing the audio processing applied to a sound signal, such as by changing an algorithm or algorithm coefficients or reducing the number of operations performed on an audio signal in a decoding or encoding process, or by reducing the number of calculations needed in filtering or otherwise operating on the audio signal. This reduction in digital signal processing results in a power savings as well as a reduced workload on the digital signal processor, conserving battery life and freeing processor resources at the possible expense of some audio fidelity. In one such example, a decoder that is decoding MP3 compressed audio decodes only 12 bits of information at a 22.05 kHz sampling rate rather than 16 bits of information at a 44.1 kHz sampling rate, resulting in significantly fewer operations needed to decode the audio signal.

In another example, some sounds such as game event indicators and music are reproduced at their full fidelity, while other sounds having less critical fidelity or containing only limited frequencies such as a spoken voice are processed using reduced fidelity, reducing the amount of information that must be processed in the audio module. In another embodiment, information content of an audio signal is selectively reduced based on other factors, such as power consumption or digital signal processor utilization. In one example, a credit bang-up sound and a theme song that are played continuously and include a wide range of frequencies might be desirably reproduced in as full fidelity as is possible, while a background voice signal providing comments consistent with a theme of the game that has a relatively narrow frequency range can be significantly altered with little perceived reduction in sound quality. Because a human voice typically has a fundamental range of 250 Hz or lower, frequency response up to a few thousand Hertz can accurately reproduce vocal fundamentals and most overtones or harmonics, resulting in a natural sounding voice. There is no need in such cases to use a 44.1 kHz sampling rate, when an 11.025 kHz sampling rate will provide frequency response over 5 kHz at a quarter the bit rate, and still sound essentially the same given the limited frequency content of a vocal audio signal and limited fidelity of the speaker 407.

The examples presented here have shown how processor utilization and power consumption can be reduced by reducing the information content of a digital audio signal. Reduced speaker fidelity in portable wagering game machines and other factors such as the audio source can limit the amount of information in an audio signal that is usable to provide perceivably higher quality output, such that audio information can in many situations be discarded with little or no reduction in perceived audio quality. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game machine, comprising:
- at least one processor;
- at least one speaker;
- at least one input device used to receive monetary value;
- a wagering game module including program code executable by the at least one processor and operable to present a wagering game upon which monetary value can be wagered using the at least one input device; and
- an audio module including program code executable by the at least one processor and operable to process a digital audio signal generated from the wagering game module and selectively reduce the information content of the digital audio signal for playback on the at least one speaker, based on: a determination of audio resources currently available within the wagering game machine, a comparison between the audio resources currently available and audio resources required by the digital audio signal, and a determination of audible sound degradation using the audio resources currently available caused by reducing the information content in the digital audio signal.

2. The computerized wagering game machine of claim 1, wherein selectively reducing the information content of a digital audio signal comprises changing the digital audio signal sampling rate.

3. The computerized wagering game machine of claim 1, wherein selectively reducing the information content of a digital audio signal comprises reducing the digital audio signal sample resolution.

4. The computerized wagering game machine of claim 1, wherein selectively reducing the information content of a digital audio signal comprises varying a digital audio signal processing algorithm.

5. The computerized wagering game machine of claim 1, wherein selectively reducing the information content of a digital audio signal based on available audio resources comprises selectively reducing the information content of the digital audio signal based on processor utilization.

6. The computerized wagering game machine of claim 1, wherein selectively reducing the information content of a digital audio comprises selectively reducing the information content of the digital audio signal based on speaker fidelity.

7. The computerized wagering game machine of claim 1, wherein selectively reducing the information content of a digital audio signal comprises selectively reducing the information content of the digital audio signal based on power consumption.

8. The computerized wagering game machine of claim 1, further comprising selectively reducing the information content of a digital audio signal based on the type of sound encoded in the digital audio signal.

9. A method of operating a computerized wagering game machine having at least one processor, at least one audio resource including at least one speaker incorporated into the wagering game machine, and at least one input device for receiving monetary value, the method comprising:
- presenting, using the at least one processor, a wagering game upon which monetary value can be wagered using the at least one input device;
- determine, using the at least one processor, current availability of audio resources within the wagering game machine; and
- selectively reducing the information content of a digital audio signal provided from the wagering game, using the at least one processor, based on the determination of audio resources currently available within the wagering game machine.

10. The method of operating a computerized wagering game machine of claim 9, wherein selectively reducing the information content of a digital audio signal comprises at least one of: changing the digital audio signal sampling rate, reducing the digital audio signal sample resolution, or varying a digital audio signal processing algorithm applied to the digital audio signal.

11. The method of operating a computerized wagering game machine of claim 9, wherein selectively reducing the information content of a digital audio signal comprises selectively reducing the information content of the digital audio signal based on processor utilization.

12. The method of operating a computerized wagering game machine of claim 9, wherein selectively reducing the information content of a digital audio signal comprises selectively reducing the information content of the digital audio signal based on speaker fidelity.

13. The method of operating a computerized wagering game machine of claim 9, wherein selectively reducing the information content of a digital audio signal comprises selectively reducing the information content of the digital audio signal based on power consumption.

14. The method of operating a computerized wagering game machine of claim 9, further comprising selectively reducing the information content of a digital audio signal based on the type of sound encoded in the digital audio signal.

15. The method of operating a computerized wagering game machine of claim 9, wherein selectively reducing the information content of a digital audio signal comprises at least one of: changing a configuration setting in the wagering game machine, or configuring an audio module within the wagering game machine differently for different wagering game machine hardware configurations.

16. A machine-readable storage medium with instructions stored thereon, the instructions when executed on a computerized wagering game machine operable to cause at least one processor of the computerized wagering game machine to:

present a wagering game upon which monetary value can be wagered, wherein the monetary value is wagered in response to an input received at least one input device provided by the wagering game machine for receiving monetary value;

determine audio resources currently available within the wagering game machine, wherein the audio resources include at least one speaker incorporated into the wagering game machine for playback of audio from the wagering game; and selectively reduce the information content of a digital audio signal based on the determination of audio resources currently available within the wagering game machine.

17. The machine-readable storage medium of claim 16, wherein selectively reducing the information content of a digital audio signal comprises at least one of:

changing the digital audio signal sampling rate, reducing the digital audio signal sample resolution, or varying a digital audio signal processing algorithm applied to the digital audio signal.

18. The machine-readable storage medium of claim 16, wherein selectively reducing the information content of a digital audio signal comprises at least one of: selectively reducing the information content of the digital audio signal based on processor utilization, selectively reducing the information content of the digital audio signal based on speaker fidelity, or selectively reducing the information content of the digital audio signal based on power consumption.

19. The machine-readable storage medium of claim 16, the instructions further causing the at least one processor of the computerized wagering game machine to selectively reduce the information content of a digital audio signal based on the type of sound encoded in the digital audio signal.

20. The machine-readable storage medium of claim 16, wherein selectively reducing the information content of a digital audio signal comprises changing a configuration setting in the wagering game machine.

* * * * *

UNITED STATES PATENT AND TRADEMARK OFFICE

CERTIFICATE OF CORRECTION

PATENT NO. : 8,231,467 B2
APPLICATION NO. : 12/599247
DATED : July 31, 2012
INVENTOR(S) : Paul Radek It is certified that error appears in the above-identified patent and that said Letters Patent is hereby corrected as shown below:

On the face page, in field (57), in “Abstract”, in column 2, line 2, before “gaming”, insert --a--, therefor On the face page, in field (57), in “Abstract”, in column 2, line 4, after “is operable”, insert --to--, therefor In column 2, line 61, after “is operable”, insert --to--, therefor In column 5, line 45, delete “104” and insert --303--, therefor Signed and Sealed this
Fourth Day of December, 2012

David J. Kappos
*Director of the United States Patent and Trademark Office*